(12) United States Patent
Kim et al.

(10) Patent No.: US 9,776,247 B2
(45) Date of Patent: **\*Oct. 3, 2017**

(54) HOLLOW METAL NANO PARTICLES

(71) Applicant: LG CHEM, LTD., Seoul (KR)

(72) Inventors: Sang Hoon Kim, Daejeon (KR); Gyo Hyun Hwang, Daejeon (KR); Jun Yeon Cho, Daejeon (KR); Kwanghyun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/355,172

(22) PCT Filed: May 10, 2013

(86) PCT No.: PCT/KR2013/004178
§ 371 (c)(1),
(2) Date: Apr. 29, 2014

(87) PCT Pub. No.: WO2013/169079
PCT Pub. Date: Nov. 14, 2013

(65) Prior Publication Data
US 2014/0342157 A1 Nov. 20, 2014

(30) Foreign Application Priority Data
May 11, 2012 (KR) .................. 10-2012-0050483
Jan. 30, 2013 (KR) .................. 10-2013-0010526

(51) Int. Cl.
*B22F 9/24* (2006.01)
*B22F 1/00* (2006.01)
(Continued)

(52) U.S. Cl.
CPC .............. *B22F 9/24* (2013.01); *B22F 1/0018* (2013.01); *B22F 1/0044* (2013.01); *B22F 1/0051* (2013.01); *B22F 1/0062* (2013.01); *B82Y 30/00* (2013.01); *C22C 5/04* (2013.01); *B22F 2001/0029* (2013.01); *B22F 2304/05* (2013.01);
(Continued)

(58) Field of Classification Search
None
See application file for complete search history.

(56) References Cited

U.S. PATENT DOCUMENTS 6,660,058 B1 12/2003 Oh et al.
7,374,599 B1 5/2008 Shelnutt et al.
(Continued)

FOREIGN PATENT DOCUMENTS

CN 1476413 A 2/2004
CN 102019431 A 4/2011
(Continued)

OTHER PUBLICATIONS

Applied Catalysis B: Environmental: "Facile fabrication of hollow Pt/Ag nanocomposites having enhanced catalytic properties", 103 (2011) 253-260.
(Continued)

*Primary Examiner* — Alexandre Ferre
*Assistant Examiner* — Elaine M Vazquez
(74) *Attorney, Agent, or Firm* — Dentons US LLP

(57) ABSTRACT

The present application relates to hollow metal nano particles.

19 Claims, 13 Drawing Sheets

(51) Int. Cl.
*C22C 5/04* (2006.01)
*B82Y 30/00* (2011.01)

(52) U.S. Cl.
CPC ... *B22F 2304/052* (2013.01); *B22F 2304/054* (2013.01); *C01P 2004/34* (2013.01); *Y10T 428/12181* (2015.01); *Y10T 428/2982* (2015.01)

(56) References Cited

U.S. PATENT DOCUMENTS

| | | | |
|---|---|---|---|
| 7,608,237 | B2 | 10/2009 | Alexandridis et al. |
| 7,972,437 | B2 | 7/2011 | Alivisatos et al. |
| 2005/0170178 | A1 | 8/2005 | Chen et al. |
| 2006/0057384 | A1 | 3/2006 | Simard et al. |
| 2006/0275196 | A1* | 12/2006 | Alexandridis ......... B82Y 10/00 423/509 |
| 2008/0096986 | A1 | 4/2008 | Thomazeau et al. |
| 2008/0145641 | A1 | 6/2008 | Li et al. |
| 2009/0232992 | A1 | 9/2009 | Koike |
| 2009/0263485 | A1* | 10/2009 | Li et al. .................. 424/489 |
| 2010/0143721 | A1 | 6/2010 | Chen et al. |
| 2010/0258759 | A1 | 10/2010 | Archer et al. |
| 2011/0311635 | A1 | 12/2011 | Stucky et al. |
| 2012/0101007 | A1 | 4/2012 | Ahern et al. |
| 2012/0104639 | A1 | 5/2012 | Traynor et al. |

FOREIGN PATENT DOCUMENTS

| | | | |
|---|---|---|---|
| JP | 2004057954 | A | 2/2004 |
| JP | 2004224673 | A | 8/2004 |
| JP | 2006045582 | A | 2/2006 |
| KR | 10-2009-0077159 | A | 7/2009 |
| WO | 0242201 | A1 | 5/2002 |
| WO | 2006105102 | A2 | 10/2006 |
| WO | WO 2009/088250 | A2 | 7/2009 |

OTHER PUBLICATIONS

Applied Catalysis B: Environmental, "Facile fabrication of hollow Pt/Ag nanocomposites having enhanced catalytic properties"; Kim et al. pp. 253-260.

Ultrasonics Sonochemistry, 9, 2002, pp. 311-316 "Formation of vesicle-templated CdSe hollow spheres in an ultrasound-induced anionic surfactant solution", Xiuwen Zheng et al.

Journal of the American Chemical Society, 2005, 127, pp. 12504-12505 "One-Pot Synthesis of Hollow Superparamagnetic CoPt Nanospheres" Yolanda Vasquez et al.

Chemistry of Materials, 2007,19, pp. 1840-1844 "Facile Synthesis of Co-Pt Hollow Sphere Electrocatalyst" , Ge Chen.

Pal et al, "Shape controlled synthesis of iron-cobalt alloy magnetic nanoparticles using soft template method", Matt. Letts., vol. 64 pp. 1127-1129 (2010).

Lee et al, "One-pot Synthesis of Metallic Hollow Nanoparticles of Tin and Lead", Bull. Korean. Chem. Soc., vol. 30, No. 5, pp. 1135-1138 (2000).

Office Action of Korean Patent Office in Appl'n No. 10-2013-0053216, dated May 14, 2015.

Office Action with English translation issued by the Japanese Patent Office in Appl'n No. 2014-538737, dated Jan. 5, 2016.

Office Action with English translation issued by the Japanese Patent Office in Appl'n No. 2014-530616, dated Jan. 5, 2016.

Haolan Xu and Wenzhong Wang, "Template Synthesis of Multishelled Cu2O Hollow Spheres with a Single-Crystalline Shell Wall," Angewandte Chemie International Edition, 2007, 46, pp. 1489-1492.

Szilvia Papp, Rita Patakfalvi, Imre Dekany, "Formation and Stabilization of Noble Metal Nanoparticles," Croatica Chemica Acta, 80 (3-4), 2007, pp. 493-502.

Zhuangjun Fan, Kai Wang, Tong Wei, Jun Yan, Liping Song, Bo Shao, "An environmentally friendly and efficient route for the reduction of graphene oxide by aluminum powder," Carbon, 48, 2010, pp. 1686-1689, available online Jan. 6, 2010.

Office Action of the U.S. Patent Office in U.S. Appl. No. 14/593,439, dated Feb. 7, 2017.

Office Action of Korean Patent Office in Appl' n No. 10-2013-0053216, dated Jul. 23, 2015.

Office Action of Chinese Patent Office in Appl' n No. 201380003917.0, dated Aug. 4, 2015.

Office Action of Japanese Patent Office in Appl' n No. 2014-538737, dated Jul. 21, 2015.

Office Action of Japanese Patent Office in Appl' n No. 2014-530616, dated Jul. 21, 2015.

* cited by examiner

[Figure 1]
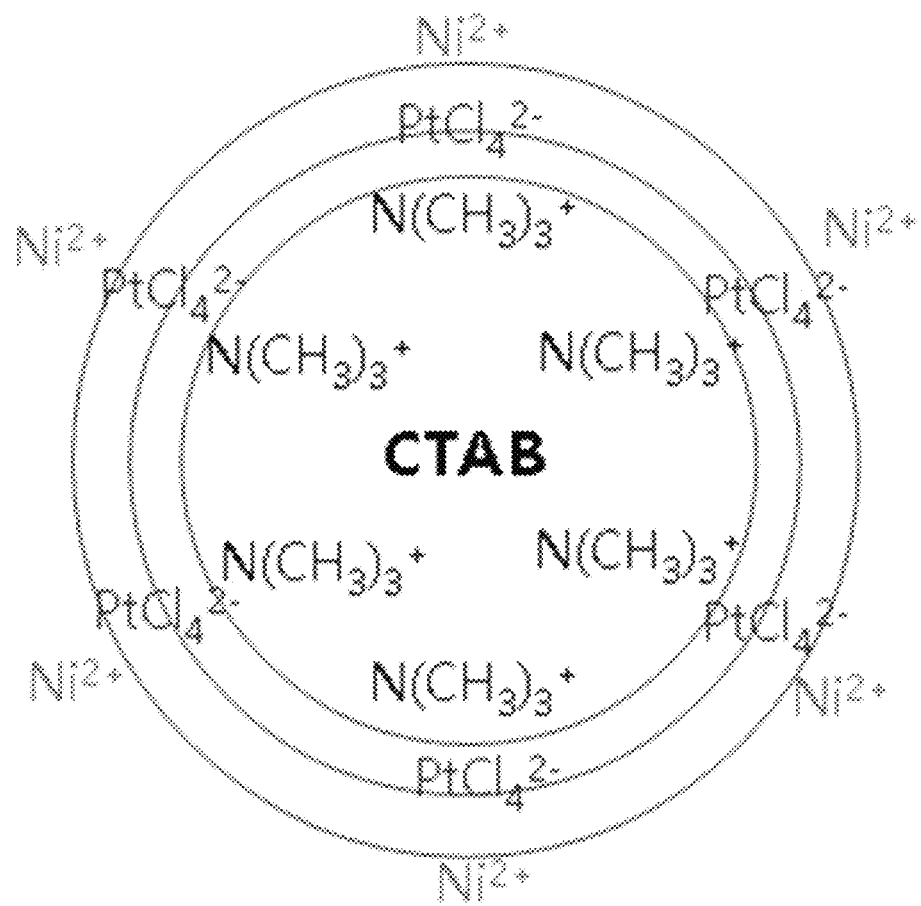

[Figure 2]
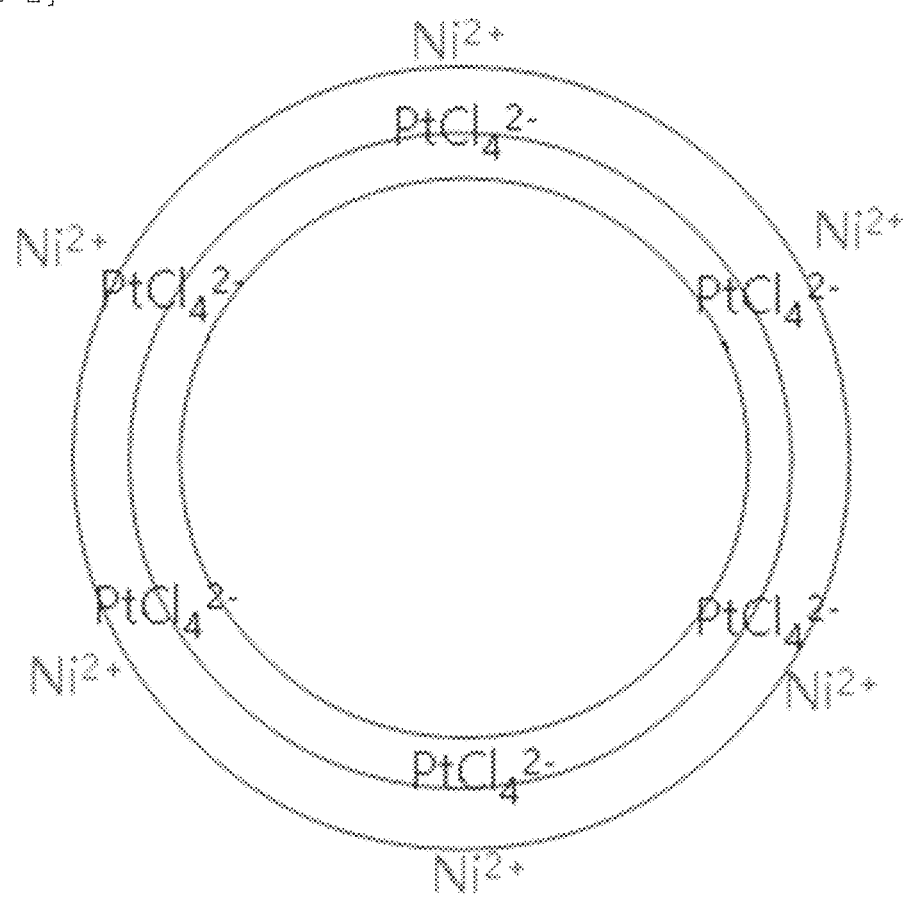

[Figure 3]
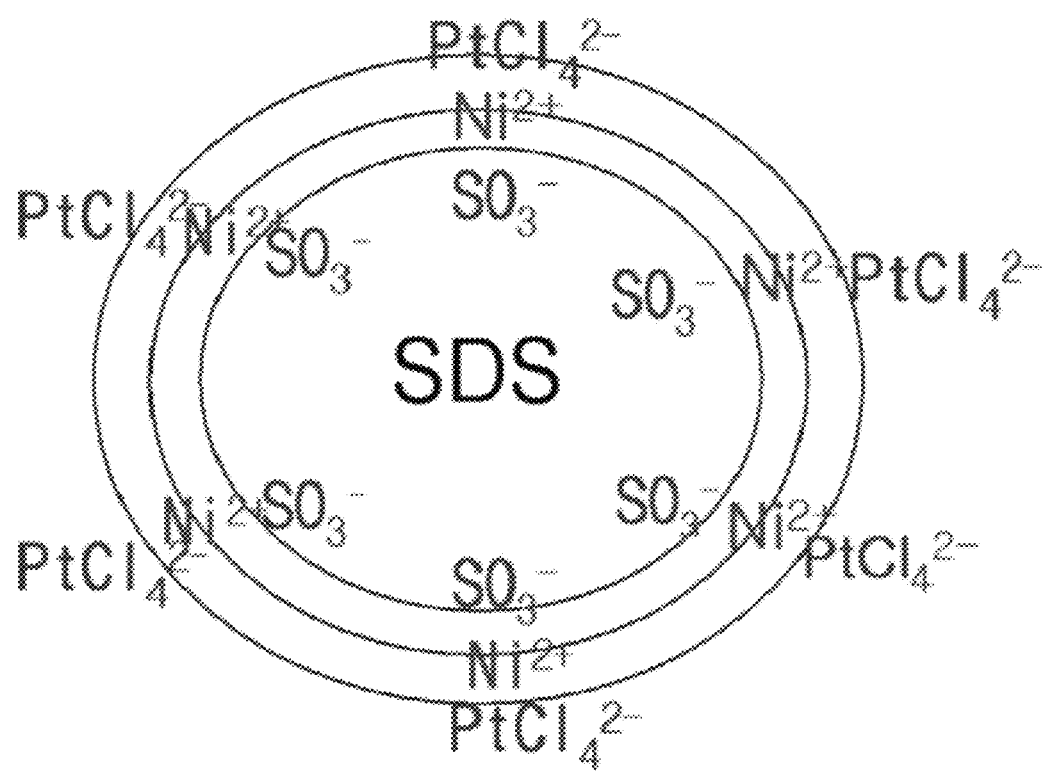

[Figure 4]
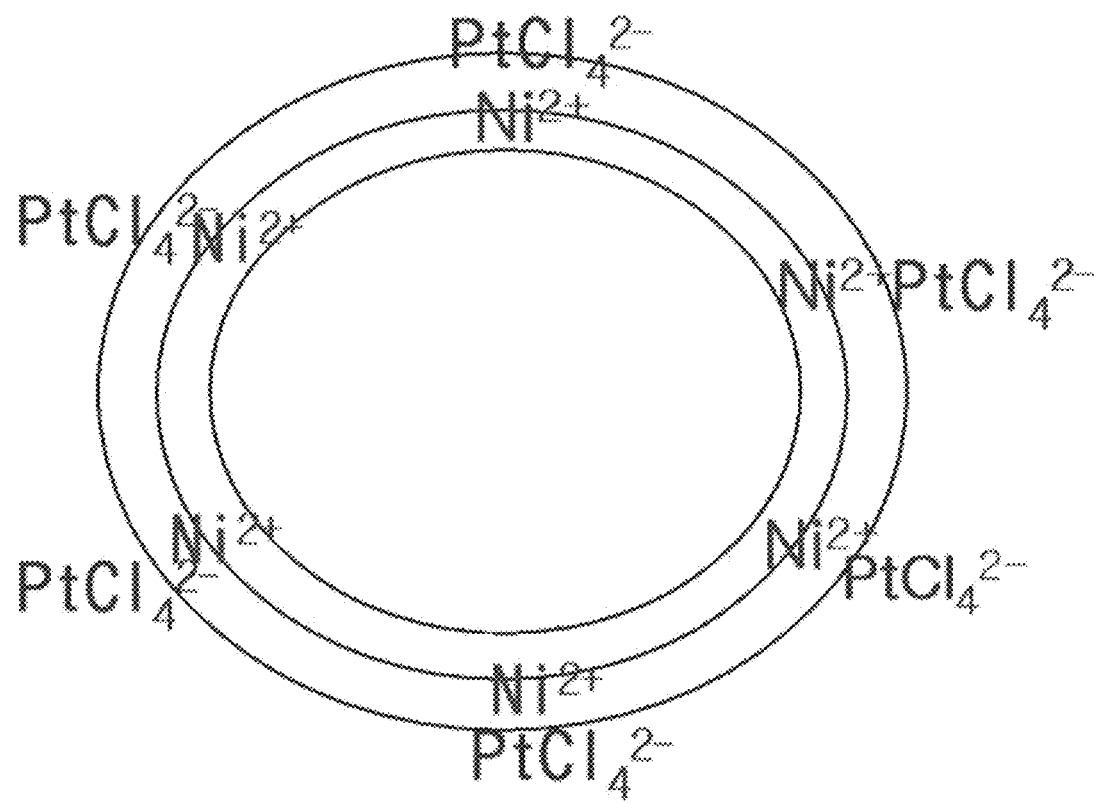

[Figure 5]
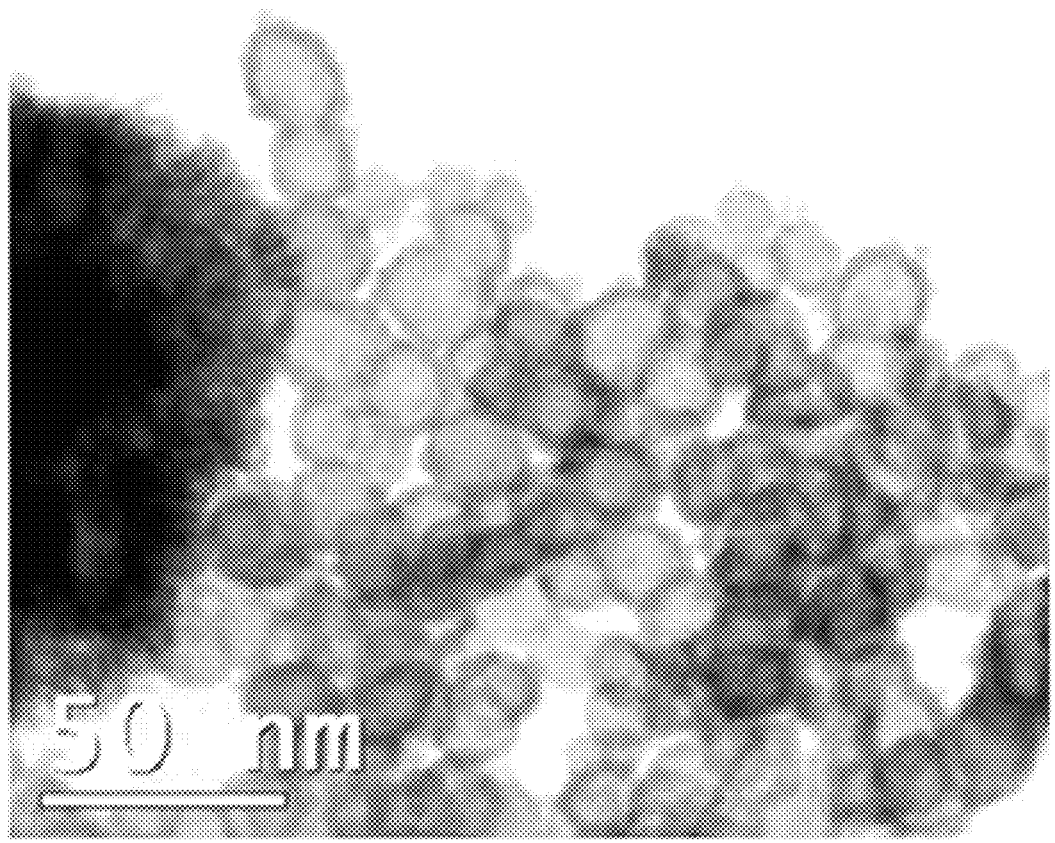

[Figure 6]
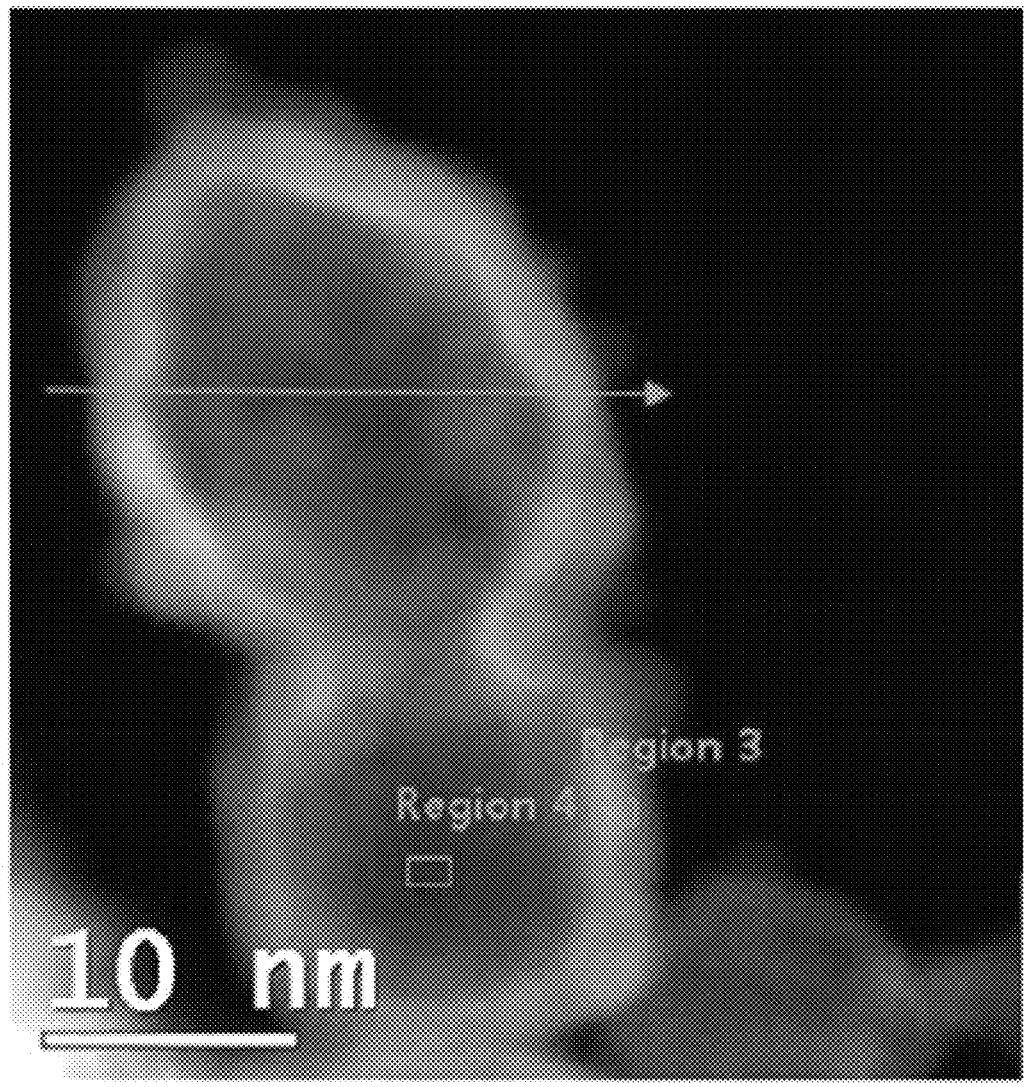

[Figure 7]
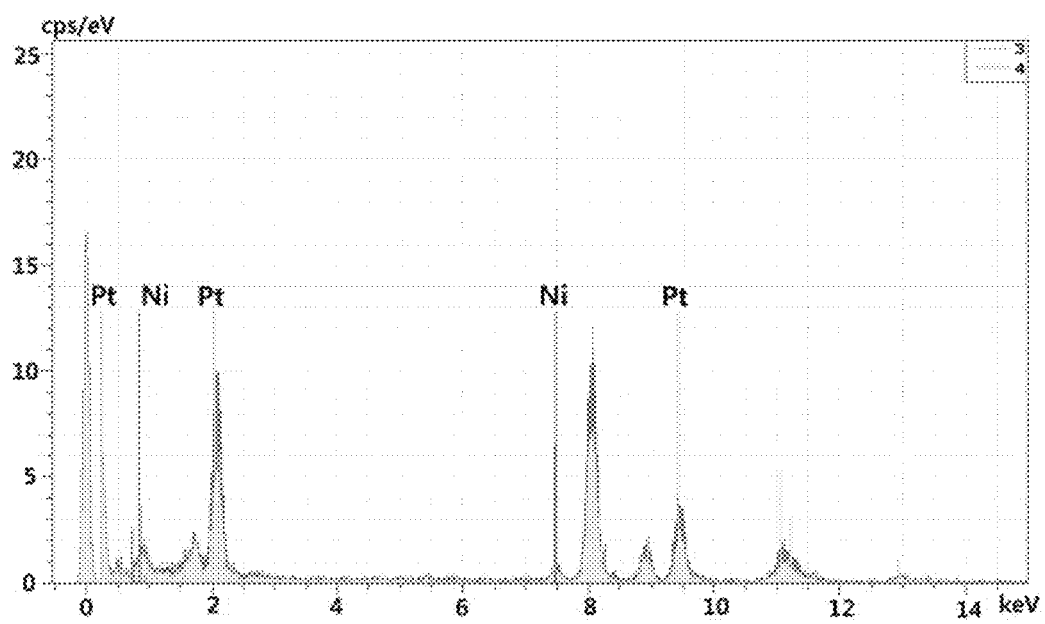

[Figure 8]
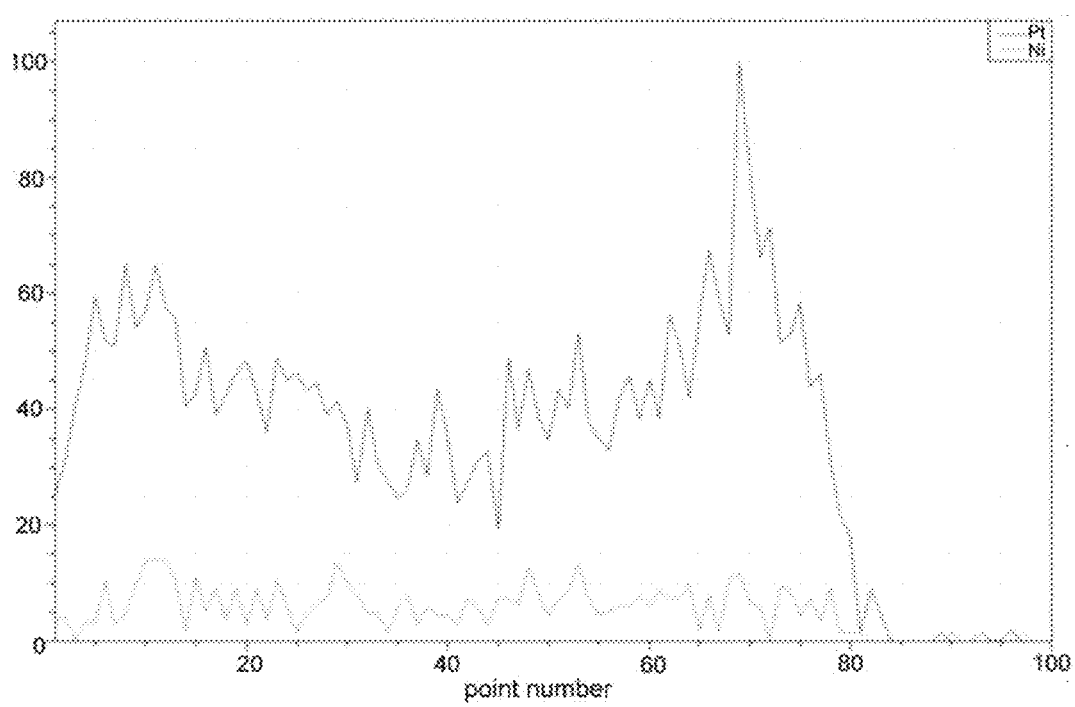

[Figure 9]
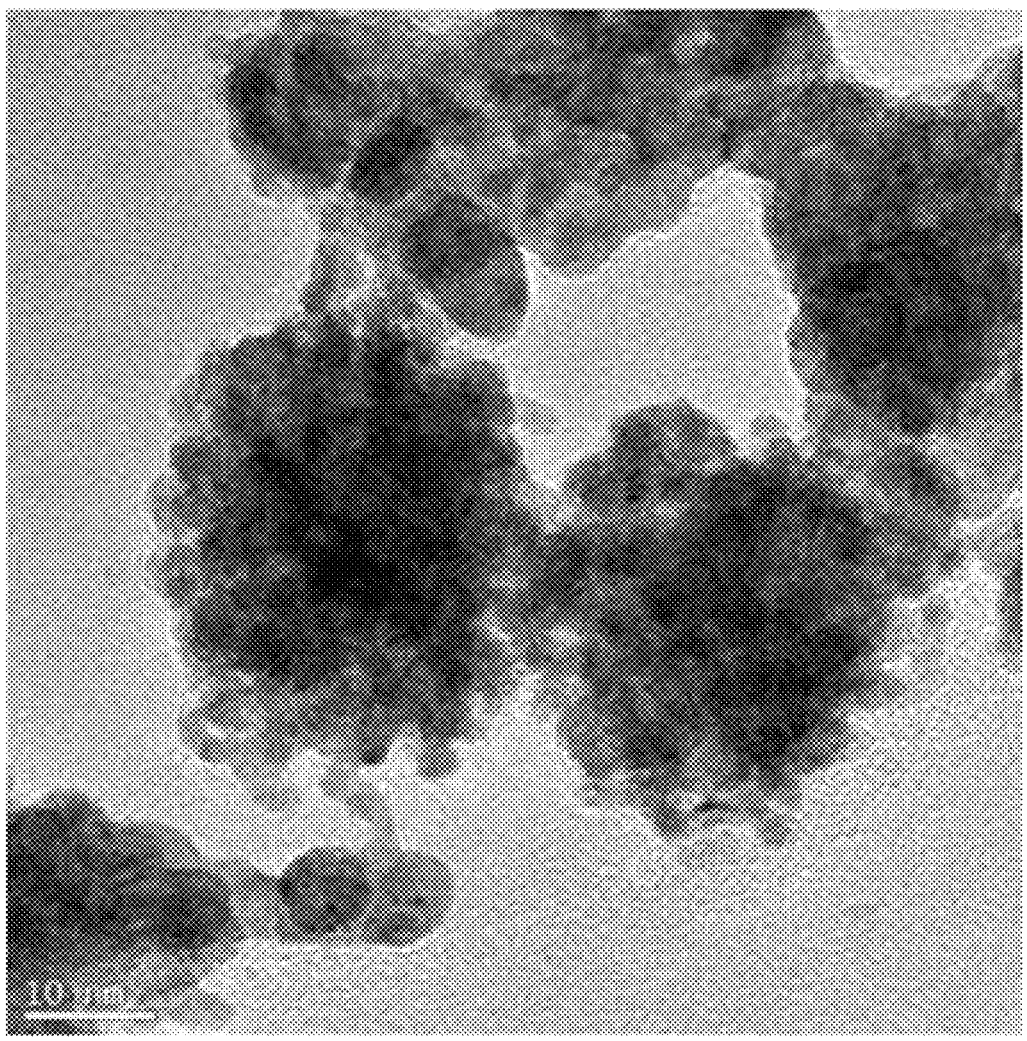

[Figure 10]
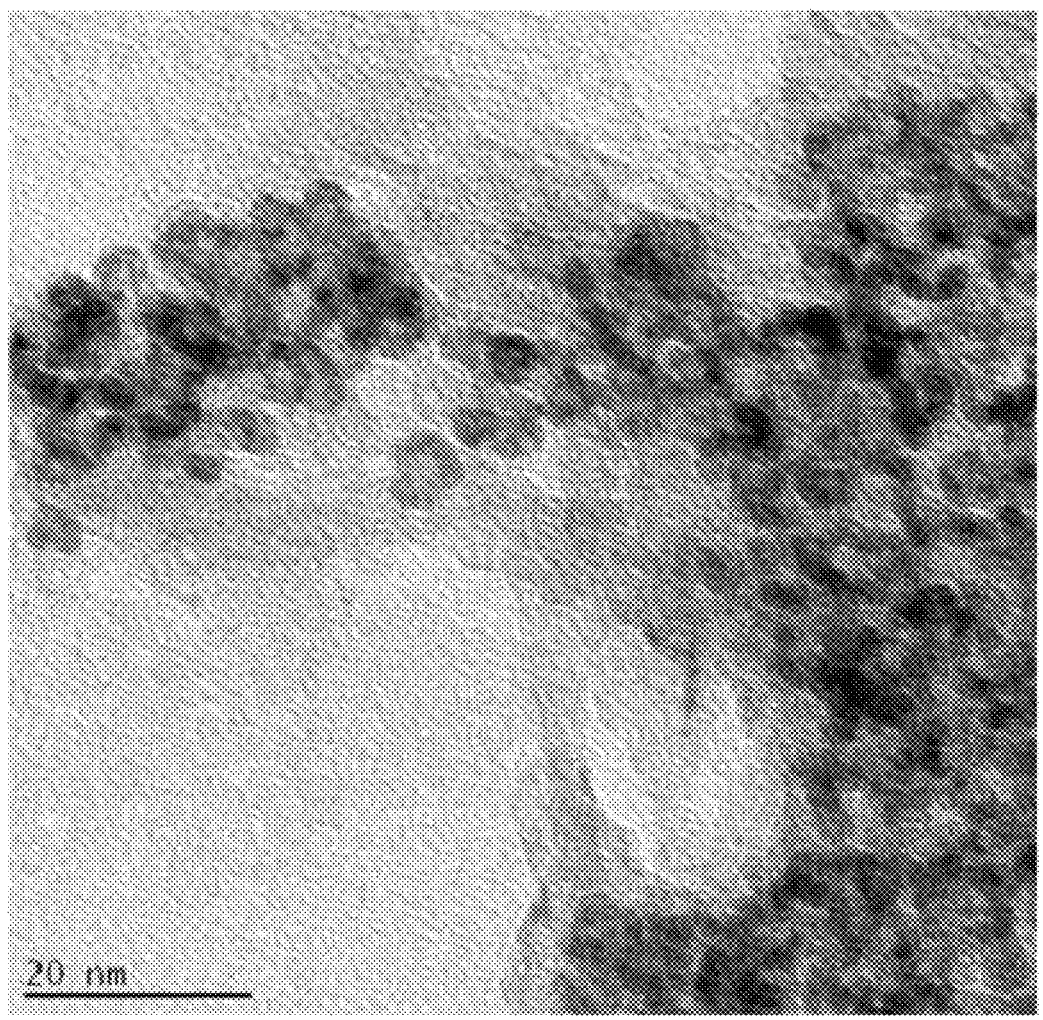

[Figure 11]
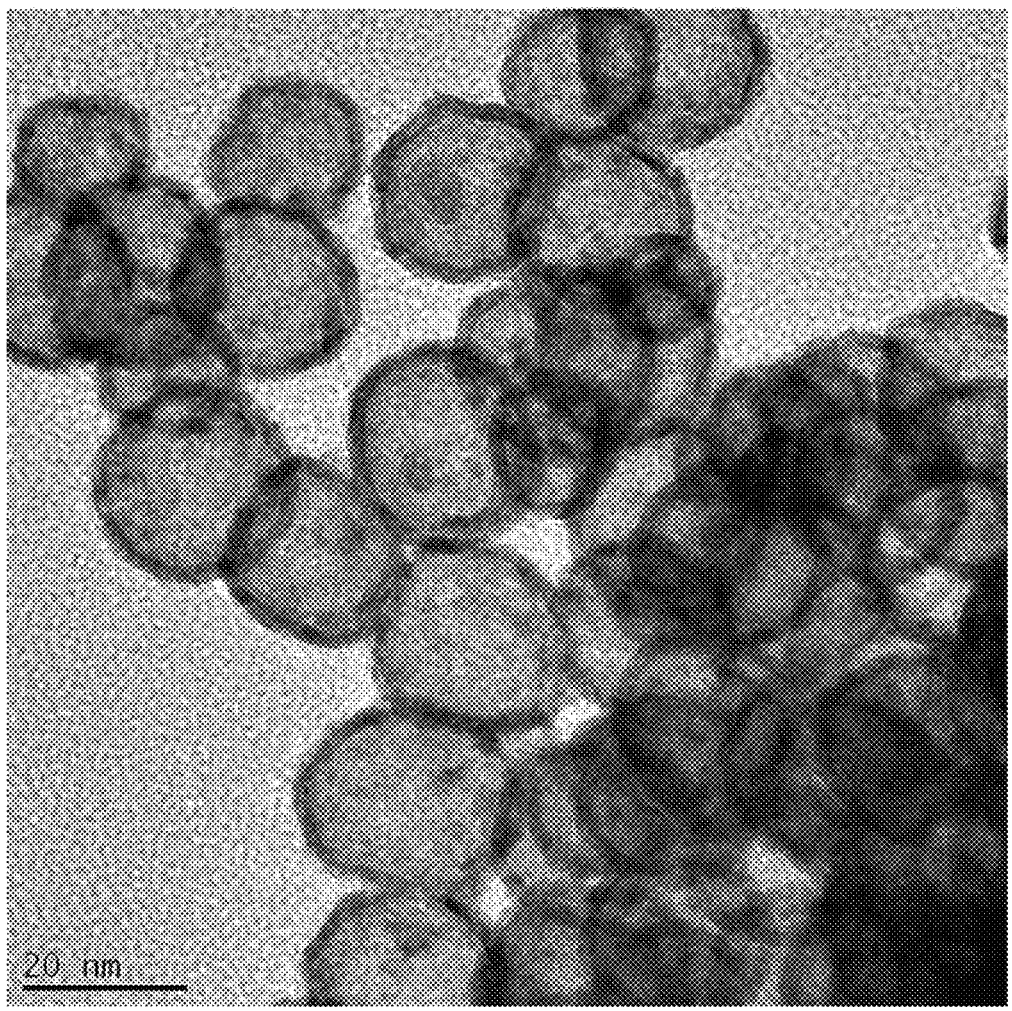

[Figure 12]
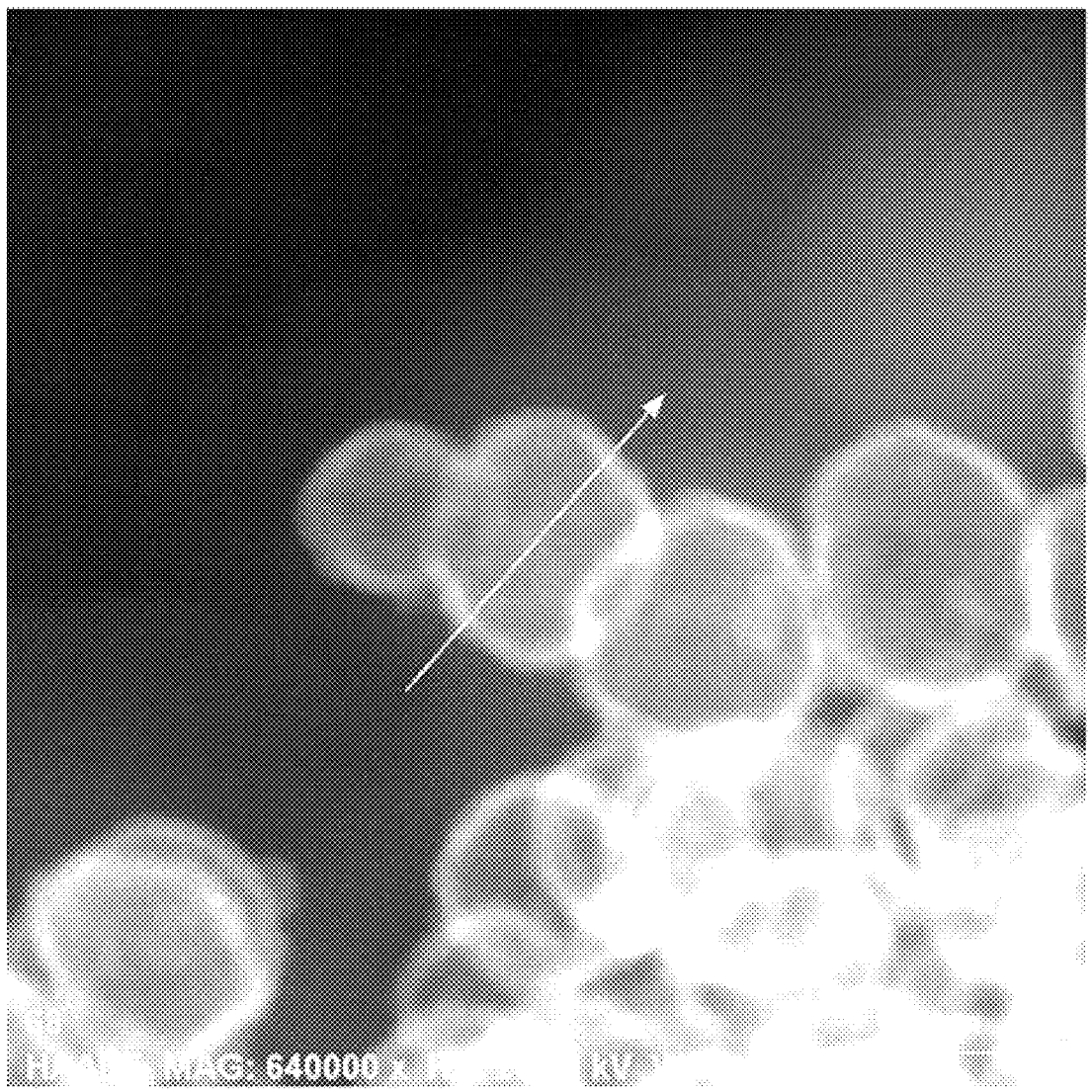

[Figure 13]
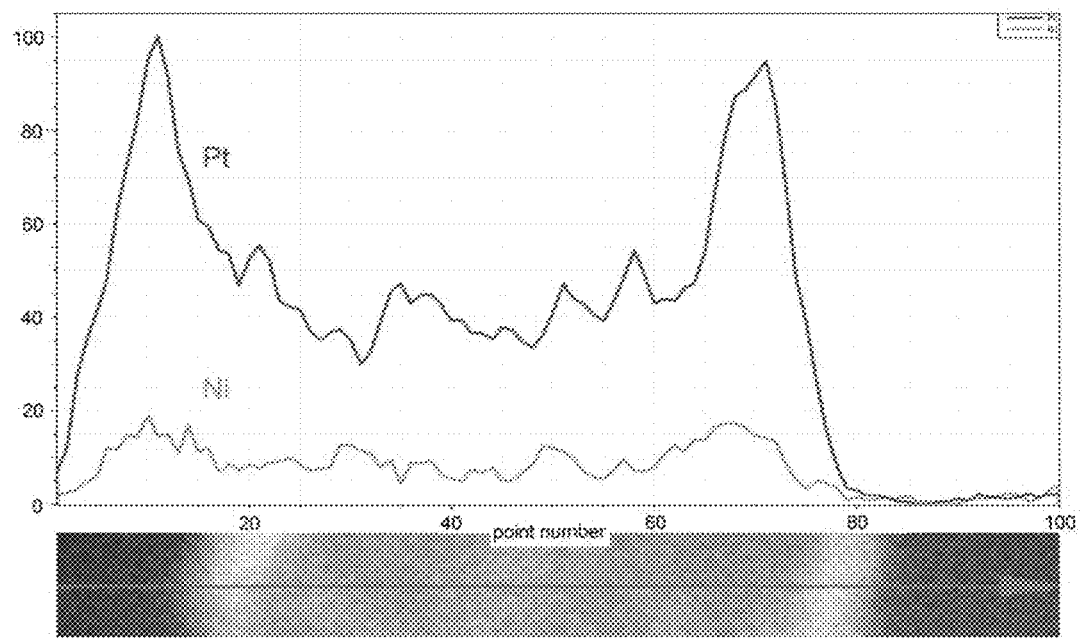

HOLLOW METAL NANO PARTICLES

CROSS-REFERENCE TO RELATED APPLICATIONS

This application is a National Stage Application of International Application No. PCT/KR2013/004178, filed on May 10, 2013, and claims priority to and the benefit of Korean Patent Application No. 10-2012-0050483, filed on May 11, 2012, and Korean Patent Application No. 10-2013-0010526, filed on Jan. 30, 2013, the disclosures of which are incorporated herein by reference in their entirety.

TECHNICAL FIELD

The present application relates to hollow metal nano particles.

BACKGROUND ART

The particle size, and exhibit optical, electric, and magnetic characteristics of nano particles are completely different from those of a bulk-state material due to a quantum confinement effect in which the energy required for electron transfer is changed depending on the size of material, and a large specific surface area. Thus, due to these properties, much interest has been focused on the applicability in the fields of catalysts, electro-magnetics, optics, medicine, and the like. Nano particles may be an intermediate between bulk and molecule, and in terms of an approach in two ways, that is, a "Top-down" approach and a "Bottom-up" approach, it is possible to synthesize nano particles.

Examples of a method for synthesizing metal nano particles include a method for reducing metal ions with a reducing agent in a solution, a method using gamma rays, an electrochemical method, and the like. However, methods in the related art are problematic in that it is difficult to synthesize nano particles having a uniform size and shape, or the use of an organic solvent leads to environmental pollution, high costs, and the like. For these various reasons, it was difficult to economically mass-produce nano particles. Therefore, there is a need to develop high-quality nano particles having a uniform size.

SUMMARY OF THE INVENTION

The present application has been made in an effort to provide high-quality hollow metal nano particles having a uniform size.

An exemplary embodiment of the present application provides hollow metal nano particles including: a hollow core portion; and a shell portion including a first metal and a second metal, in which at least two major peaks showing an atomic percentage of at least one of the first metal and the second metal are present in element analysis data of the particles.

An exemplary embodiment of the present application provides hollow metal nano particles including: a hollow core portion; and a shell portion including a first metal and a second metal, in which at least two major peaks showing an atomic percentage of at least one of the first metal and the second metal are present in element analysis data of the particles, and there are a plurality of peaks showing an atomic percentage of the first metal or the second metal are present in an entire region of particle diameters.

An exemplary embodiment of the present application provides hollow metal nano particles including: a hollow core portion; and a shell portion including a first metal and a second metal, in which at least two major peaks showing an atomic percentage of the first metal are present, and at least two major peaks showing an atomic percentage of the second metal are present.

An exemplary embodiment of the present application provides hollow metal nano particles including: a hollow core; at least one first shell including a first metal; and at least one second shell including a second metal.

An exemplary embodiment of the present application provides hollow metal nano particles including: a hollow core; and at least one shell including a first metal and a second metal.

The present application is advantageous in that hollow metal nano particles having a uniform size of several nanometers are provided, and may be applied in various fields.

BRIEF DESCRIPTION OF THE DRAWINGS

FIG. 1 illustrates a model of hollow metal nano particles including a surfactant among hollow metal nano particles fabricated according to Example 1.

FIG. 2 illustrates a model of hollow metal nano particles from which a surfactant is removed among the hollow metal nano particles fabricated according to Example 1.

FIG. 3 illustrates a model of hollow metal nano particles including a surfactant among hollow metal nano particles fabricated according to Example 2.

FIG. 4 illustrates a model of hollow metal nano particles from which a surfactant is removed among the hollow metal nano particles fabricated according to Example 2.

FIG. 5 illustrates a transmission electron microscope (TEM) image of the hollow metal nano particles fabricated according to Example 1.

FIG. 6 illustrates the point of the hollow core indicated as Region 4 and the point of the shell indicated as Region 3 in an HR-TEM image of the hollow metal nano particles fabricated according to Example 1.

FIG. 7 illustrates an EDS result that elements in Region 3 and Region 4 are analyzed in the image of FIG. 6.

FIG. 8 illustrates a result that the atomic percentages of elements positioned along the line of an arrow are analyzed by an EDS line profile in the image of FIG. 6.

FIG. 9 illustrates a transmission electron microscope (TEM) image of hollow metal nano particles fabricated according to Comparative Example 1.

FIG. 10 illustrates a transmission electron microscope (TEM) image of the hollow metal nano particles fabricated according to Example 2.

FIGS. 11 and 12 illustrate transmission electron microscope (TEM) images of hollow metal nano particles fabricated according to Example 3.

FIG. 13 illustrates a result that the atomic percentages of elements positioned along the line of an arrow are analyzed by an EDS line profile in the hollow metal nano particles of FIG. 12.

DETAILED DESCRIPTION

The advantages and features of the present application, and methods of accomplishing these will become obvious with reference to the exemplary embodiments to be described below in detail along with the accompanying drawings. However, the present application is not limited to exemplary embodiments to be disclosed below, but will be implemented in various forms different from each other.

The exemplary embodiments are merely intended to make the disclosure of the present application complete and provided to completely notify the scope of the invention to the person with ordinary skill in the art to which the present application belongs, and the present application is only defined by the scope of the claims. The size and relative size of the constituent elements marked in the drawings may be exaggerated for clarity of description.

Unless otherwise defined, all terms (including technical and scientific terms) used in the present specification may be used as the meaning which may be commonly understood by the person with ordinary skill in the art to which the present application belongs. It will be further understood that terms defined in commonly used dictionaries should not be interpreted ideally or excessively unless expressly and specifically defined.

Hereinafter, the present application will be described in detail.

An exemplary embodiment of the present application provides hollow metal nano particles including: a hollow core portion; and a shell portion including a first metal and a second metal, in which at least two major peaks showing an atomic percentage of at least one of the first metal and the second metal are present in element analysis data of the particles.

In a graph showing the atomic percentage of an element included in the particles in element analysis data of the particles in the present application, a peak means points having a sharp shape while the slope of the graph changes from positive to negative.

In an exemplary embodiment of the present application, a major peak means a peak positioned at each top of hills of a connection line that connects peaks among peaks showing the atomic percentages included in the particles in element analysis data of the particles. Here, one peak positioned at the top of each hill may be present, but two or more peaks having the same atomic percentage may be present.

In another exemplary embodiment of the present application, a major peak means a peak positioned at each top of hills having a height higher than an average value of peaks among hills of a connection line that connects peaks among peaks showing the atomic percentages included in the particles in element analysis data of the particles. Here, the average value of peaks means an average value of all the peaks showing the atomic percentages.

In yet another exemplary embodiment of the present application, a major peak means a peak positioned at the top of the highest or second highest peak among hills of a connection line that connects peaks among peaks showing the atomic percentages included in the particles in element analysis data of the particles.

In an exemplary embodiment of the present application, when the particle diameter of the hollow metal nano particles is set to 100%, at least one major peak showing the atomic percentage of the first metal may be present within a region that is 0% to 30% from one end point of the particle diameters, and at least another major peak showing the atomic percentage of the first metal may be present within a region that is 0% to 30% from the other end point of the particle diameters.

Further, in an exemplary embodiment of the present application, when the particle diameter of the hollow metal nano particles is set to 100%, at least one major peak showing the atomic percentage of the second metal is present within a region that is 0% to 30% from one end point of the particle diameters, and at least another major peak showing the atomic percentage of the second metal may be present within a region that is 0% to 30% from the other end point of the particle diameters.

At this time, the particle diameter of hollow metal nano particles means a length from a starting point or one end point to the other end point in a graph in which the peaks of the first metal are connected, and the starting point or the end point means a point where a graph in which the peaks of the first metal are connected starts, or a point where the height becomes 0 in a graph in which the peaks of the first metal are connected.

In an exemplary embodiment of the present application, at least two peaks showing the atomic percentage of the second metal may be present. At this time, when the particle diameter of the hollow metal nano particles is set to 100%, at least one major peak showing the atomic percentage of the second metal may be present within a region that is 0% to 30% from one end point of the particle diameters, and at least another major peak showing the atomic percentage of the second metal may be present within a region that is 0% to 30% from the other end point of the particle diameters.

Furthermore, the particle diameter of hollow metal nano particles means a length from a starting point or one end point to the other end point in a graph in which the peaks of the second metal are connected, and the starting point or the end point means a point where a graph in which the peaks of the second metal are connected starts, or a point where the height becomes 0 in a graph in which the peaks of the second metal are connected.

In an exemplary embodiment of the present application, a plurality of peaks showing the atomic percentage of the first metal or the second metal may be present in an entire region of particle diameters.

An exemplary embodiment of the present application may provide hollow metal nano particles including: a hollow core portion; and a shell portion including a first metal and a second metal, in which at least two major peaks showing an atomic percentage of the first metal are present in element analysis data of the particles, and a plurality of peaks showing an atomic percentage of the second metal is present in an entire region of particle diameters.

An exemplary embodiment of the present application may provide hollow metal nano particles including: a hollow core portion; and a shell portion including a first metal and a second metal, in which at least two major peaks showing an atomic percentage of the second metal are present in element analysis data of the particles, and a plurality of peaks showing an atomic percentage of the first metal is present in an entire region of particle diameters.

An exemplary embodiment of the present application may provide hollow metal nano particles including: a hollow core portion; and a shell portion including a first metal and a second metal, in which at least two major peaks showing an atomic percentage of the first metal are present in element analysis data of the particles, and at least two major peaks showing an atomic percentage of the second metal are present in element analysis data of the particles.

The cross-sectional element analysis data of the particles may be obtained using an energy dispersive spectrometer (EDS). Specifically, the cross-sectional element analysis data is obtained by confirming which element is measured in a 2-D region when particles are observed through transmission electron microscopy from the above. That is, it is possible to observe the hollow metal nano particles in the form of a major peak because elements are more densely distributed in the shell portion than in a region where a hollow portion is positioned. Furthermore, when elements are present in a relatively trace amount, a plurality of peaks may be observed in the entire region.

In the present specification, hollow means that core portions of hollow metal nano particles are empty. In addition, the hollow may also be used as the same meaning as a hollow core. The hollow includes the terms of hollow, hole, void, and porous.

In an exemplary embodiment of the present application, the hollow may include a space in which an internal material is not present by 50% by volume or more, specifically 70% by volume or more, and more specifically 80% by volume or more. Alternatively, the hollow may also include a space of which the inside is empty by 50% by volume or more, specifically 70% by volume or more, and more specifically 80% by volume or more. Further, the hollowness includes a space having an internal porosity of 50% by volume or more, specifically 70% by volume or more, and more specifically 80% by volume.

According to an exemplary embodiment of the present application, the volume of the hollow core may be 50% by volume or more of, specifically 70% by volume or more of, and more specifically 80% by volume or more of the total volume of the hollow metal nano particles.

According to an exemplary embodiment of the present application, the shell portion of the hollow metal nano particles may be formed of a metal including the first metal and the second metal. That is, the shell portion of the hollow metal nano particles of the present invention may be formed of a metal instead of a metal oxide.

The shell portion of the present application may be present over an entire surface outside the hollow portion, and may also be present in the form of surrounding the hollow portion. Specifically, according to an exemplary embodiment of the present application, the shell portion may be formed throughout the outer side surface of hollow portion. That is, the shell portion of the present application may constitute the forms of the hollow metal nano particles.

According to an exemplary embodiment of the present application, the hollow metal nano particles may have a spherical shape. In this case, the form of the shell portion of the present application may have a spherical shape including a hollow core.

The spherical shape of the present application does not mean only a completely spherical shape, and may include an approximately spherical shape. For example, in the hollow metal nano particles, the spherically shaped outer surface may not be flat, and the radius of curvature in one hollow metal nano particle may not be uniform.

In an exemplary embodiment of the present application, the shell portion may be a shell of a single layer, or a shell of two or more layers.

In an exemplary embodiment of the present application, the shell portion may include a plurality of shells including: a first shell including a first metal; and a second shell including a second metal.

In an exemplary embodiment of the present application, when the shell portion has a single layer, the first metal and the second metal may be present in a mixed form. At this time, the first metal and the second metal may be mixed uniformly or non-uniformly.

According to an exemplary embodiment of the present application, the atomic percentage ratio of the first metal to the second metal in the shell portion may be 1:5 to 10:1.

In an exemplary embodiment of the present application, when the shell portion has a single layer, the ratio of the first metal in the shell may be present in a gradation state. The second metal may be present at a constant ratio in the shell, and the first metal may be present at a ratio in a gradation form.

As an example, based on the cross-section of the shell, the ratio of the first metal is highest at the center portion, and the ratio of the first metal may be decreased from the center portion to both ends of the shell. That is, the ratio of the first metal may be increased from a portion adjacent to the hollow core to the center of the shell, and then decreased from the center of the shell to the outer edge of the shell. At this time, a point where the ratio of the first metal is highest may be present at the center portion of the shell.

As another example, in a portion that is in contact with the hollow core in the shell, the first metal may be present in an amount of 50% by volume or more, or 70% by volume or more, and in a surface portion that is in contact with the outside in the shell, the second metal may be present in an amount of 50% by volume or more, or 70% by volume or more.

Alternatively, the shell may be each a first shell or a second shell which is separately formed so that the mixture ratio of the first metal and the second metal is different. At this time, in each shell, the atomic percentage ratio of the first metal:the second metal may be 1:5 to 10:1.

In an exemplary embodiment of the present application, when the shell portion has two or more layers, each shell may include only the first metal or the second metal. For example, the hollow metal nano particles may include: a hollow core; one or two or more first shells including the first metal; and one or two or more second shells including the second metal.

In an exemplary embodiment of the present application, the first shell may be present over the entire surface outside the hollow portion.

The second shell may be present in at least one region of the outer surface of the first shell, and may be present in the form of surrounding the entire surface of the outer surface of the first shell. When the second shell is present in some regions of the outer surface of the first shell, the second shell may also be present in the form of a discontinuous surface.

In an exemplary embodiment of the present application, the hollow metal nano particles may include a hollow core, a first shell including a first metal formed throughout the outer surface of the hollow core, and a second shell including a second metal formed throughout the outer surface of the first shell. Alternatively, in an exemplary embodiment of the present application, the hollow metal nano particles may include a shell of a single layer including a first metal and a second metal which are formed throughout the outer surface of the hollow core. In this case, the hollow metal nano particles may also include a surfactant having positive charges in the hollow core.

In an exemplary embodiment of the present application, the first metal may be selected from the group consisting of metals belonging to Group 3 to Group 15 of the periodic table, metalloids, lanthanide metals, and actinide metals, and specifically, may be one selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu).

In an exemplary embodiment of the present application, the second metal may be different from the first metal. The second metal may be selected from the group consisting of metals belonging to Group 3 to Group 15 of the periodic table, metalloids, lanthanide metals, and actinide metals, and specifically, may be at least one selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu).

As a specific example, the first metal may be selected from the group consisting of platinum (Pt), silver (Ag), palladium (Pt), and gold (Au), and even more specifically, may be platinum (Pt). At this time, the second metal may be selected from the group consisting of ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), cerium (Ce), silver (Ag), and copper (Cu), and further more specifically, may be nickel (Ni).

As another specific example, the first metal may be selected from the group consisting of ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), cerium (Ce), silver (Ag), and copper (Cu), and further more specifically, may be nickel (Ni). At this time, the second metal may be selected from the group consisting of platinum (Pt), silver (Ag), palladium (Pt), and gold (Au), and even more specifically, may be platinum (Pt).

An exemplary embodiment of the present application may provide hollow metal nano particles including: a hollow core; at least one first shell including a first metal; and/or at least one second shell including a second metal.

An exemplary embodiment of the present application may provide hollow metal nano particles including: a hollow core; and at least one shell including a first metal and a second metal.

In an exemplary embodiment of the present application, the shell may have a single layer, and two or more layers.

In an exemplary embodiment of the present application, when the shell has a single layer, the first metal and the second metal may be present while being mixed. At this time, the first metal and the second metal may be mixed uniformly or non-uniformly.

In an exemplary embodiment of the present application, when the shell has a single layer, the atomic percentage ratio of the first metal to the second metal of the shell portion may be 1:5 to 10:1.

In an exemplary embodiment of the present application, when the shell has a single layer, the first metal and the second metal in the shell may be present in a state of gradation, the first metal may be present in an amount of 50% by volume or more, or 70% by volume or more at a portion adjacent to the hollow core in the shell, and the second metal may be present in an amount of 50% by volume or more or 70% by volume or more at a surface portion adjacent to the external portion in the shell.

In an exemplary embodiment of the present application, when the shell has a single layer, the shell may include only the first metal or the second metal.

In an exemplary embodiment of the present application, the hollow metal nano particles may have an average particle diameter of 30 nm or less, more specifically 20 nm or less, or 12 nm or less, or 10 nm or less. Alternatively, the hollow metal nano particles may have an average particle diameter of 6 nm or less. The hollow metal nano particles may have an average particle diameter of 1 nm or more. When the hollow metal nano particles have an average particle diameter of 30 nm or less, the nano particles are advantageous in that the nano particles may be used in various fields. Further, when the hollow metal nano particles have an average particle diameter of 20 nm or less, the hollow metal nano particles are more preferred. In addition, when the hollow metal nano particles have an average particle diameter of 10 nm or less, or 6 nm or less, the surface area of particles is further increased, and thus the hollow metal nano particles are advantageous in that the applicability which may be used in various fields is further broadened. For example, when the hollow metal nano particles formed to have the particle diameter range are used as a catalyst, the efficiency thereof may be significantly enhanced.

According to an exemplary embodiment of the present application, the average particle diameter of the hollow metal nano particles means a value obtained by measuring 200 or more hollow metal nano particles using a graphic software (MAC-View), and measuring an average particle diameter through an obtained statistical distribution.

According to an exemplary embodiment of the present application, the hollow metal nano particles may have an average particle diameter from 1 nm to 30 nm.

According to an exemplary embodiment of the present application, the hollow metal nano particles may have an average particle diameter from 1 nm to 20 nm.

According to an exemplary embodiment of the present application, the hollow metal nano particles may have an average particle diameter from 1 nm to 12 nm.

According to an exemplary embodiment of the present application, the hollow metal nano particles may have an average particle diameter from 1 nm to 10 nm.

According to an exemplary embodiment of the present application, the hollow metal nano particles may have an average particle diameter from 1 nm to 6 nm.

In an exemplary embodiment of the present application, the shell portion in the hollow metal nano particles may have a thickness more than 0 nm and 5 nm or less, more specifically, more than 0 nm and 3 nm or less.

For example, the hollow metal nano particles may have an average particle diameter of 30 nm or less, and the shell portion may have a thickness more than 0 nm and 5 nm or less. More specifically, the hollow metal nano particles may have an average particle diameter of 20 nm or less, or 10 nm or less, and the shell portion may have a thickness more than 0 nm and 3 nm or less. According to an exemplary embodiment of the present application, the hollow metal nano particles may have an average particle diameter from 1 nm to 10 nm, specifically, from 1 nm to 4 nm. Furthermore, each shell may have a thickness from 0.25 nm to 5 nm, specifically, from 0.25 nm to 3 nm. The shell portion may also be a shell formed by mixing the first metal and the second metal, and may be a plurality of shells including a first shell and a second shell which are separately formed by varying the mixing ratio of a first metal and a second metal, respectively. Alternatively, the shell portion may be a plurality of shells including a first shell including only a first metal and a second shell including only a second metal.

In an exemplary embodiment of the present application, the particle diameter of a plurality of hollow metal nano particles formed may be within a range from 80% to 120% of the average particle diameter of the hollow metal nano particles. Specifically, the particle diameter of the hollow metal nano particles may be within a range from 90% to 110% of the average particle diameter of hollow metal nano particles. When the particle diameter exceeds the range, the size of the hollow metal nano particles is overall irregular, and thus it may be difficult to secure an intrinsic physical property value required by the hollow metal nano particles. For example, when hollow metal nano particles having a particle diameter exceeding a range from 80% to 120% of the average particle diameter of the hollow metal nano particles are used as a catalyst, the activity of the catalyst may be a little insufficient.

In an exemplary embodiment of the present application, the hollow nano particles may include an anionic surfactant or a cationic surfactant inside the hollow core.

The hollow metal nano particles according to an exemplary embodiment of the present application may be fabricated by the following fabrication method.

The fabrication method according to an exemplary embodiment of the present application provides a method for fabricating hollow metal nano particles, the method including: forming a solution by adding a first metal salt, a second metal salt, and a surfactant to a solvent; and forming hollow metal nano particles by adding a reducing agent to the solution, in which the forming of the solution includes forming a micelle by the surfactant, and surrounding an outer portion of the micelle with the first metal salt and the second metal salt, and the forming of the hollow metal nano particles includes forming the micelle region to a hollow form.

The fabrication method according to an exemplary embodiment of the present application does not use a reduction potential difference, and thus is advantageous in that a reduction potential between a first metal and a second metal is not considered. Since charges between metal ions are used, the fabrication method is advantageous in that the method is simpler than the fabrication method in the related art, and thus facilitates mass production.

In an exemplary embodiment of the present application, the first metal salt is not particularly limited as long as the first metal salt may be ionized in a solution to provide metal ions of a first metal. The first metal salt may include the first metal. Here, the first metal may be different from a second metal.

Here, the first metal of the first metal salt may be selected from the group consisting of metals belonging to Group 3 to Group 15 of the periodic table, metalloids, lanthanide metals, and actinide metals, and specifically, may be one selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu). More specifically, the first metal may be selected from the group consisting of ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), cerium (Ce), silver (Ag), and copper (Cu), and even more specifically, may be nickel (Ni).

In an exemplary embodiment of the present application, the second metal salt is not particularly limited as long as the second metal salt may be ionized in a solution to provide metal ions of the second metal. The second metal salt may include the second metal. Here, the second metal may be different from the first metal.

Here, the second metal of the second metal salt may be selected from the group consisting of metals belonging to Group 3 to Group 15 of the periodic table, metalloids, lanthanide metals, and actinide metals, and specifically, may be one selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu). More specifically, the second metal may be selected from the group consisting of platinum (Pt), palladium (Pt), and gold (Au), and even more specifically, may be platinum (Pt).

In an exemplary embodiment of the present application, the first metal salt and the second metal salt may be nitrate ($NO_3^-$), halide such as chloride ($Cl^-$), bromide ($Br^-$), and iodide ($I^-$), hydroxide ($OH^-$), or sulfate ($SO_4^-$) of the first metal and the second metal, respectively, but is not limited thereto.

According to an exemplary embodiment of the present application, the first metal and the second metal may form the hollow metal nano particles. Specifically, the first metal and the second metal may form a shell portion of the hollow metal nano particles, and the shell portion may include a first shell and a second shell. The first shell and the second shell of the present specification may each include the first metal and/or the second metal, but the first shell and the second shell may include different metals.

Alternatively, the shell portion of the present specification may include one shell including the first metal and the second metal.

The shell portion of the present application may be present on the entire surface outside of hollow portion, and may also be present in the form of surrounding the hollow portion. Specifically, according to an exemplary embodiment of the present application, the shell portion may be formed throughout on the outer side surface of the hollow portion. That is, the shell portion of the present application may constitute the forms of the hollow metal nano particles.

According to an exemplary embodiment of the present application, the shell portion of the hollow metal nano particles may be formed of a metal including the first metal and the second metal. That is, the shell portion of the hollow metal nano particles of the present application may be formed of a metal instead of a metal oxide.

According to an exemplary embodiment of the present application, the hollow metal nano particles may have a spherical shape. In this case, the form of the shell portion of the present application may have a spherical shape including a hollow core.

The spherical shape of the present application does not mean only a completely spherical shape, and may include an approximately spherical shape. For example, in the hollow metal nano particles, the spherically shaped outer surface may not be flat, and the radius of curvature in one hollow metal nano particle may not be uniform.

According to an exemplary embodiment of the present application, the first metal salt may be in the form of surrounding the outer surface of a surfactant forming a micelle. In addition, the second metal salt may be in the form of surrounding the first metal salt. The first metal salt and the second metal salt may form shell portions including the first metal and the second metal, respectively by a reducing agent.

According to an exemplary embodiment of the present application, the shell portion may be formed of the first shell including the first metal and the second shell including the second metal. Alternatively, the shell portion may be formed of one shell including the first metal and the second metal.

In an exemplary embodiment of the present application, the molar ratio of the first metal salt to the second metal salt may be 1:1 to 10:1, specifically, 2:1 to 5:1. When the mole number of the first metal salt is smaller than the mole number of the second metal salt, it is difficult for the first metal to form a first shell including hollow portions. Furthermore, when the mole number of the first metal salt exceeds the mole number of the second metal salt by 10 times, it is difficult for the second metal salt to form a second shell surrounding the first shell.

According to an exemplary embodiment of the present application, the atomic percentage ratio of the first metal to the second metal of the shell portion may be 1:5 to 10:1. When the shell portion is formed of the first shell and the second shell, the atomic percentage ratio may be an atomic percentage ratio of the first metal of the first shell to the second metal of the second shell. Alternatively, the atomic percentage ratio may be an atomic percentage ratio of the first metal to the second metal when the shell portion is formed of one shell including the first metal and the second metal.

According to an exemplary embodiment of the present application, when the shell portion is formed of one shell including the first metal and the second metal, the first metal and the second metal may also be mixed uniformly or non-uniformly.

Alternatively, according to an exemplary embodiment of the present application, the shell portion may be present in a state where the first metal and the second metal are gradated, the first metal may be present in an amount of 50% by volume or more or 70% by volume or more at a portion adjacent to the hollow core in the shell portion, and the second metal may be present in an amount of 50% by volume or more or 70% by volume or more at a surface portion adjacent to the outer portion of nano particles in the shell portion.

According to an exemplary embodiment of the present application, the solvent may be a solvent including water. Specifically, in an exemplary embodiment of the present application, the solvent serves to dissolve the first metal salt and the second metal salt, and may be water or a mixture of water and a $C_1$ to $C_6$ alcohol, specifically, water. When water is used as a solvent in the present application, an organic solvent is not used, and thus a post-treatment process of treating an organic solvent in the fabrication process is not needed. Therefore, there are effects of reducing costs and preventing environmental pollution.

According to an exemplary embodiment of the present application, the surfactant may form a micelle in the solution. It is possible to classify electric charges of the surfactant depending on the type of electric charge on the outer side surface of the micelle. That is, when the electric charge on the outer side surface of the micelle is anionic, the surfactant forming the micelle may be an anionic surfactant. Further, when the electric charge on the outer side surface of the micelle is cationic, the surfactant forming the micelle may be a cationic surfactant.

In an exemplary embodiment of the present application, the surfactant may be an anionic surfactant. Specifically, the anionic surfactant may be selected from the group consisting of potassium laurate, triethanolamine stearate, ammonium lauryl sulfate, lithium dodecyl sulfate, sodium lauryl sulfate, sodium dodecyl sulfate, alkyl polyoxyethylene sulfate, sodium alginate, dioctyl sodium sulfosuccinate, phosphatidyl glycerol, phosphatidyl inositol, phosphatidylserine, phosphatidic acid and salts thereof, glyceryl ester, sodium carboxymethylcellulose, bile acid and salts thereof, cholic acid, deoxycholic acid, glycocholic acid, taurocholic acid, glycodeoxycholic acid, alkyl sulfonate, aryl sulfonate, alkyl phosphate, alkyl sulfonate, stearic acid and salts thereof, calcium stearate, phosphate, sodium carboxymethyl cellulose, dioctyl sulfosuccinate, dialkyl ester of sodium sulfosuccinic acid, phospholipid and calcium carboxymethyl cellulose.

When the surfactant is an anionic surfactant, the outer side surface of the surfactant forming the micelle is anionically charged, and thus may be surrounded by the first metal salt that is cationally charged. Furthermore, the first metal salt may be surrounded by the second metal salt that is anionically charged.

According to an exemplary embodiment of the present application, the first metal salt that is cationically charged and the second metal salt that is anionically charged are not present in a region where the anionic surfactant forms a micelle, thereby forming hollow portions. That is, when the first metal salt and the second metal salt are formed of a shell portion including the first metal and the second metal by a reducing agent, the region constituting the micelle may become a hollow core that does not include a metal.

In an exemplary embodiment of the present application, the surfactant may be a cationic surfactant. Specifically, the cationic surfactant may be selected from the group consisting of quaternary ammonium compounds, benzalkonium chloride, cetyl trimethyl ammonium bromide, chitonic acid, lauryl dimethyl benzyl ammonium chloride, acyl carnitine hydrochloride, alkyl pyridinium halide, cetylpyridinium chloride, cationic lipids, polymethylmethacrylate trimethyl ammonium bromide, sulfonium compounds, polyvinylpyrrolidone-2-dimethylaminoethyl methacrylate dimethyl sulfate, hexadecyl trimethyl ammonium bromide, phosphonium compounds, benzyl-di(2-chloroethyl)ethyl ammonium bromide, coconut trimethyl ammonium chloride, coconut trimethyl ammonium bromide, coconut methyl dihydroxyethyl ammonium chloride, coconut methyl dihydroxyethyl ammonium bromide, decyl triethyl ammonium chloride, decyl dimethyl hydroxyethyl ammonium chloride bromide, $C_{12\text{-}15}$-dimethyl hydroxyethyl ammonium chloride, $C_{12\text{-}15}$-dimethyl hydroxyethyl ammonium chloride bromide, coconut dimethyl hydroxyethyl ammonium chloride, coconut dimethyl hydroxyethyl ammonium bromide, myristyl trimethyl ammonium methyl sulphate, lauryl dimethyl benzyl ammonium chloride, lauryl dimethyl benzyl ammonium bromide, lauryl dimethyl(ethenoxy)$_4$ ammonium chloride, lauryl dimethyl(ethenoxy)$_4$ ammonium bromide, N-alkyl ($C_{12\text{-}18}$)dimethylbenzyl ammonium chloride, N-alkyl ($C_{14\text{-}18}$)dimethyl-benzyl ammonium chloride, N-tetradecyldimethylbenzyl ammonium chloride monohydrate, dimethyl didecyl ammonium chloride, N-alkyl($C_{12\text{-}14}$)dimethyl 1-naphthylmethyl ammonium chloride, trimethylammonium halide alkyl-trimethylammonium salts, dialkyl-dimethylammonium salts, lauryl trimethyl ammonium chloride, ethoxylated alkyamidoalkyldialkylammonium salts, ethoxylated trialkyl ammonium salts, dialkylbenzene dialkylammonium chloride, N-didecyldimethyl ammonium chloride, N-tetradecyldimethylbenzyl ammonium chloride monohydrate, N-alkyl($C_{12\text{-}14}$)dimethyl 1-naphthylmethyl ammonium chloride, dodecyldimethylbenzyl ammonium chloride, dialkyl benzenealkyl ammonium chloride, lauryl trimethyl ammonium chloride, alkylbenzyl methyl ammonium chloride, alkyl benzyl dimethyl ammonium bromide, $C_{12}$ trimethyl ammonium bromide, $C_{15}$ trimethyl ammonium bromide, $C_{17}$ trimethyl ammonium bromide, dodecylbenzyl triethyl ammonium chloride, polydiallyldimethylammonium chloride, dimethyl ammonium chloride, alkyldimethylammonium halogenide, tricetyl methyl ammonium chloride, decyltrimethylammonium bromide, dodecyltriethylammonium bromide, tetradecyltrimethylammonium bromide, methyl trioctylammonium chloride, POLYQUAT 10, tetrabutylammonium bromide, benzyl trimethylammonium bromide, choline esters, benzalkonium chloride, stearalkonium chloride, cetyl pyridinium bromide, cetyl pyridinium chloride, halide salts of quaternized polyoxyethylalkylamines, "MIRAPOL" (polyquaternium-2), "Alkaquat" (alkyl dimethyl benzylammonium chloride, manufactured by Rhodia), alkyl pyridinium salts, amine, amine salts, imide azolinium salts, protonated quaternary acrylamides, methylated quaternary polymers, cationic gua gum, benzalkonium chloride, dodecyl trimethyl ammonium bromide, triethanolamine, and poloxamine.

When the surfactant is a cationic surfactant, the outer side surface of the surfactant forming the micelle is cationically charged, and thus may be surrounded by the first metal salt that is anionically charged. Furthermore, the first metal salt may be surrounded by the second metal salt that is cationically charged.

According to an exemplary embodiment of the present application, the first metal salt that is anionically charged and the second metal salt that is cationically charged are not present in a region where the cationic surfactant forms a micelle, thereby forming hollow portions. That is, when the first metal salt and the second metal salt are formed of a shell portion including the first metal and the second metal by a reducing agent, the region constituting the micelle may become a hollow core that does not include a metal.

In an exemplary embodiment of the present application, when water is selected as the solvent, the concentration of surfactant in the solution may be one time or more and 5 times or less of the critical micelle concentration (CMC) to water.

When the concentration of the surfactant is one time less than the critical micelle concentration, the concentration of the surfactant adsorbed to the first metal salt may be relatively decreased. Accordingly, the amount of a surfactant forming a core to be formed may also be entirely decreased. Meanwhile, when the concentration of the surfactant is 5 times higher than the critical micelle concentration, the concentration of the surfactant is relatively increased, and thus the surfactant which forms the hollow core and metal particles which do not form the hollow core may be mixed and aggregated.

According to an exemplary embodiment of the present application, it is possible to control the size of the hollow metal nano particles by controlling the surfactant which forms the micelle and/or the first and second metal salts which surround the micelle.

According to an exemplary embodiment of the present application, it is possible to control the size of hollow metal nano particles by the chain length of the surfactant which forms the micelle. Specifically, when the chain length of the surfactant is short, the size of the micelle may be decreased and the hollow size may also be decreased, thereby decreasing the size of the hollow metal nano particles.

According to an exemplary embodiment of the present application, the carbon number of the chains of the surfactant may be 15 or less. Specifically, the carbon number of the chain may be 8 or more and 15 or less. Alternatively, the carbon number of the chain may be 10 or more and 12 or less.

According to an exemplary embodiment of the present application, it is possible to control the size of hollow metal nano particles by controlling the type of the counter ion of the surfactant which forms the micelle. Specifically, as the size of the counter ion of the surfactant is increased, the bonding strength of the outer end of the surfactant with the head portion thereof becomes weak, and thus the size of hollow portions may be increased. Accordingly, the size of hollow metal nano particles may be increased.

According to an exemplary embodiment of the present specification, when the surfactant is an anionic surfactant, the surfactant may include $NH_4^+$, $K^+$, $Na^+$, or $Li^+$ as a counter ion.

Specifically, the size of hollow nano particles may be decreased when the counter ion of the surfactant is $NH_4^+$, $K^+$, $Na^+$, or $Li^+$ in this order. This may be confirmed by the Examples to be described below.

According to an exemplary embodiment of the present specification, when the surfactant is a cationic surfactant, the surfactant may include $I^-$, $Br^-$, or $Cl^-$ as a counter ion. Specifically, the size of hollow nano particles may be decreased when the counter ion of the surfactant is $I^-$, $Br^-$ or $Cl^-$ in this order.

According to an exemplary embodiment of the present application, it is possible to control the size of hollow metal nano particles by controlling the size of the head portion of the outer end of the surfactant which forms the micelle. Furthermore, when the size of the head portion of the surfactant formed on the outer surface of the micelle is increased, the repulsive force between head portions of the surfactant is increased, and thus the size of hollows may be increased. Accordingly, the size of hollow metal nano particles may be increased.

According to an exemplary embodiment of the present application, the size of hollow metal nano particles may be determined by complex action of the factors as described above.

According to an exemplary embodiment of the present application, the fabrication method may be carried out at normal temperature. Specifically, the fabrication method may be carried out at a temperature in a range from 4° C. to 35° C., more specifically, at 15° C. to 28° C.

In an exemplary embodiment of the present application, the forming of the solution may be carried out at normal temperature, specifically at a temperature in a range from 4° C. to 35° C., more specifically, at 15° C. to 28° C. When an organic solvent is used as the solvent, there is a problem in that the fabrication method is performed at a high temperature exceeding 100° C. Since the fabrication method may be carried out at normal temperature, the present application is advantageous in terms of process due to a simple fabrication method, and has a significant effect of reducing costs.

In an exemplary embodiment of the present application, the forming of the solution may be performed for 5 minutes to 120 minutes, more specifically for 10 minutes to 90 minutes, and even more specifically for 20 minutes to 60 minutes.

In an exemplary embodiment of the present application, the forming of the hollow metal nano particles by adding a reducing agent to the solution may also be carried out at normal temperature, specifically at a temperature in a range from 4° C. to 35° C., and more specifically at 15° C. to 28° C. Since the fabrication method may be carried out at normal temperature, the present application is advantageous in terms of process due to a simple fabrication method, and has a significant effect of reducing costs.

The forming of the hollow metal nano particles may be performed by reacting the solution with the reducing agent for a predetermined time, specifically for 5 minutes to 120 minutes, more specifically for 10 minutes to 90 minutes, and even more specifically for 20 minutes to 60 minutes.

In an exemplary embodiment of the present application, the reducing agent is not particularly limited as long as the reducing agent is a strong reducing agent having a standard reduction potential of −0.23 V or less, specifically from −4 V to −0.23 V, and has a reducing power which may reduce the dissolved metal ions to be precipitated as metal particles.

Such a reducing agent may be at least one selected from the group consisting of, for example, $NaBH_4$, $NH_2NH_2$, $LiAlH_4$, and LiBEt3H.

When a weak reducing agent is used, a reaction speed is slow and a subsequent heating of the solution is required such that it is difficult to achieve a continuous process, and thus there may be a problem in terms of mass production. In particular, when ethylene glycol, which is one of weak reducing agents, is used, there is a problem in that the productivity is low in a continuous process due to a decrease in flow rate caused by high viscosity.

According to an exemplary embodiment of the present application, the forming of the hollow metal nano particles may further include adding a non-ionic surfactant.

In an exemplary embodiment of the present application, specifically, the non-ionic surfactant may be selected from the group consisting of polyoxyethylene fatty alcohol ether, polyoxyethylene sorbitan fatty acid ester, polyoxyethylene fatty acid ester, polyoxyethylene alkyl ether, polyoxyethylene castor oil derivatives, sorbitan ester, glyceryl ester, glycerol monostearate, polyethylene glycol, polypropylene glycol, polypropylene glycol ester, cetyl alcohol, cetostearyl alcohol, stearyl alcohol, aryl alkyl polyether alcohol, polyoxyethylene polyoxypropylene copolymers, poloxamer, poloxamine, methylcellulose, hydroxycellulose, hydroxymethylcellulose, hydroxyethylcellulose, hydroxypropylcellulose, hydroxypropylmethylcellulose, hydroxypropylmethylcellulose phthalate, noncrystalline cellulose, polysaccharides, starch, starch derivatives, hydroxyethyl starch, polyvinyl alcohol, triethanolamine stearate, amine oxide, dextran, glycerol, gum acacia, cholesterol, tragacanth, and polyvinylpyrrolidone.

The non-ionic surfactant is adsorbed on the surface of the shell, and thus serves to uniformly disperse the hollow metal nano particles formed in the solution. Thus, the non-ionic surfactant may prevent hollow metal particles from being conglomerated or aggregated so as to be precipitated and allow hollow metal nano particles to be formed in a uniform size.

According to an exemplary embodiment of the present application, the forming of the hollow metal nano particles may be further adding a stabilizer.

In an exemplary embodiment of the present application, specifically, the stabilizer may include one or two or more selected from the group consisting of disodium phosphate, dipotassium phosphate, disodium citrate, and trisodium citrate.

In an exemplary embodiment of the present application, the particle diameter of a plurality of hollow metal nano particles formed may be within a range from 80% to 120% of the average particle diameter of the hollow metal nano particles. Specifically, the particle diameter of the hollow metal nano particles may be within a range from 90% to 110% of the average particle diameter of hollow metal nano particles. When the particle diameter exceeds the range, the size of the hollow metal nano particles is overall irregular, and thus it may be difficult to secure an intrinsic physical property value required by the hollow metal nano particles. For example, when hollow metal nano particles having a particle diameter exceeding a range from 80% to 120% of the average particle diameter of the hollow metal nano particles are used as a catalyst, the activity of the catalyst may be a little insufficient.

In an exemplary embodiment of the present application, the fabrication method may further include, after the forming of the hollow metal nano particles, removing a surfactant inside hollows. The removing method is not particularly limited, and for example, a method of washing the surfactant with water may be used. The surfactant may be an anionic surfactant or a cationic surfactant.

The method for fabricating hollow metal nano particles according to an exemplary embodiment of the present application may further include, after the forming of the hollow metal nano particles, removing a first shell including a first metal by adding an acid to the hollow metal nano particles.

In an exemplary embodiment of the present application, the acid is not particularly limited, and for example, it is possible to use an acid selected from the group consisting of sulfuric acid, nitric acid, hydrochloric acid, perchloric acid, hydroiodic acid, and hydrobromic acid.

In an exemplary embodiment of the present application, after the hollow metal nano particles are formed, in order to precipitate the hollow metal nano particles included in the solution, the solution including the hollow metal nano particles may be centrifuged. It is possible to collect only the hollow metal nano particles separated after the centrifugation. If necessary, a process of sintering the hollow metal nano particles may be additionally performed.

According to an exemplary embodiment of the present application, it is possible to fabricate hollow metal nano particles having a uniform size of several nanometers. By methods in the related art, it was difficult to fabricate several nanometer-sized hollow metal nano particles, and it was more difficult to fabricate uniform-sized hollow metal nano particles.

The hollow metal nano particles fabricated by the fabrication method of the present application may be used while replacing existing nano particles in the field in which nano particles may be generally used. The hollow metal nano particles of the present application have much smaller sizes and wider specific surface areas than the nano particles in the related art, and thus may exhibit better activity than the nano particles in the related art. Specifically, the hollow metal nano particles of the present application may be used in various fields such as a catalyst, drug delivery, and a gas sensor. The hollow metal nano particles may be used as a catalyst, or as an active material formulation in cosmetics, pesticides, animal nutrients, or food supplements, and may be used as a pigment in electronic products, optical elements, or polymers.

Hereinafter, the present application will be described in detail with reference to Examples for a specific description. However, the Examples according to the present application may be modified in various forms, and the scope of the present application is not interpreted as being limited to the Examples described in detail below. The Examples of the present application are provided for more completely explaining the present application to those skilled in the art.

Example 1

0.01 mmol of $K_2PtCl_4$ as a first metal salt, 0.01 mmol of $NiCl_2$ as a second metal salt, and 0.02 mmol of cetyltrimethylammonium bromide (CTAB) as a surfactant were added to and dissolved in 20 ml of distilled water to form a solution, and the solution was stirred for 30 minutes. At this time, the molar ratio of $K_2PtCl_4$ to $Ni(NO_3)_2$ was 1:1, and at this time, the concentration of the CTAB measured was approximately one time the critical micelle concentration (CMC) to water.

Subsequently, 0.2 mmol of $NaBH_4$ which is a reducing agent and 2 ml of distilled water were added to the solution and the mixture was left to react for 30 minutes. After the mixture was centrifuged at 10,000 rpm for 10 minutes, the supernatant in the upper layer was discarded, the remaining precipitate was re-dispersed in 20 ml of distilled water, and then the centrifugation process was repeated once more to fabricate hollow metal nano particles composed of a hollow core and a shell.

FIGS. 1 and 2 illustrate a model of the hollow metal nano particles fabricated according to Example 1. FIG. 5 illustrates a transmission electron microscope (TEM) image of the hollow metal nano particles fabricated according to Example 1. FIG. 6 illustrates the core point indicated as Region 4 and the shell point indicated as Region 3 in an HR-TEM image of the hollow metal nano particles fabricated according to Example 1. In FIG. 6, the hollow metal nano particles have a particle diameter of approximately 15 nm. The particle diameter of hollow metal nano particles formed was measured on 200 or more hollow metal nano particles using a graphic software (MAC-View) based on FIG. 6, and the average particle diameter was 15 nm through a statistical distribution obtained.

FIG. 7 illustrates a result that the atomic percentages of elements in Region 3 and Region 4 are analyzed in the image of FIG. 6. The analysis values are shown in Table 1.

TABLE 1

| Spectrum | Ni | Pt |
| --- | --- | --- |
| Region 3 | 12.82 | 87.18 |
| Region 4 | 19.67 | 80.33 |

FIG. 8 illustrates a result that the content of elements positioned along the line of an arrow is analyzed by an EDS line profile in the image of FIG. 6.

At this time, as an analysis machine, a JEOL JEM-ARM200F field emission transmission electron microscope equipped with a Schottky field emitter, a STEM Cs corrector, and an energy dispersive X-ray spectrometer was used, and the analysis was performed at an acceleration voltage of 200 kV and a point resolution (0.19 mm) and a line resolution (0.10 nm) as resolutions.

Referring to FIG. 8, 100% of the particle diameter of the hollow metal nano particles may be a length from a starting point to an end point in a graph in which the peaks of Pt, which is a first metal according to the definition of the present specification, are connected. At this time, the starting point is a point of point number 0, and the end point is a point of point number 84. At this time, it can be confirmed that one Pt major peak is present at a point from point number 7 to point number 12 within a region that is 0% to 30% from one end point of the particle diameters, and another Pt major peak is present at a point from point number 67 to point number 70 within a region that is 0% to 30% from the other end point of the particle diameters.

In addition, in FIG. 8, it can be confirmed that a plurality of peaks showing the atomic percentage of Ni, which is the second metal, is present in the entire region of particle diameters.

Example 2

0.07 mmol of $Ni(NO_3)_2$ as a first metal salt, 0.03 mmol of $K_2PtCl_4$ as a second metal salt, 0.12 mmol of trisodium citrate as a stabilizer, and 1.21 mmol of sodium dodecylsulfate (SDS) as a surfactant are added to and dissolved in 26 ml of water to form a solution, and the solution was stirred for 30 minutes. At this time, the molar ratio of $Ni(NO_3)_2$ to $K_2PtCl_4$ was 2:1, and at this time, the concentration of the SDS measured was approximately five times the critical micelle concentration (CMC) to water.

Subsequently, 0.4 mmol of $NaBH_4$ which is a reducing agent and 500 mg of polyvinyl pyrrolidone (PVP) as a non-ionic surfactant were added to the solution and the mixture was left to react for 30 minutes. After the mixture was centrifuged at 10,000 rpm for 10 minutes, the supernatant in the upper layer was discarded, the remaining precipitate was re-dispersed in 20 ml of water, and then the centrifugation process was repeated once more to fabricate hollow metal nano particles composed of a hollow core and a shell.

FIGS. 3 and 4 illustrate a model of the hollow metal nano particles fabricated according to Example 2. FIG. 10 illustrates a transmission electron microscope (TEM) image of the hollow metal nano particles fabricated according to Example 2.

The average particle diameter of the hollow metal nano particles obtained by Example 2 was about 5 nm.

Example 3

0.03 mmol of $Ni(NO_3)_2$ as a first metal salt, 0.01 mmol of $K_2PtCl_4$ as a second metal salt, 0.1 mmol of trisodium citrate as a stabilizer, and 1 ml of 30% ammonium laurylsulfate (ALS) as a surfactant were added to and dissolved in 26 ml of water to form a solution, and the solution was stirred for 30 minutes. At this time, the molar ratio of $Ni(NO_3)_2$ to $K_2PtCl_4$ was 3:1, and at this time, the concentration of the ALS measured was approximately two times the critical micelle concentration (CMC) to water.

Subsequently, 0.13 mmol of $NaBH_4$ which is a reducing agent was added to the solution and the mixture was left to react for 30 minutes. After the mixture was centrifuged at 10,000 rpm for 10 minutes, the supernatant in the upper layer was discarded, the remaining precipitate was re-dispersed in 20 ml of water, and then the centrifugation process was repeated once more to fabricate hollow metal nano particles composed of a hollow core and a shell.

FIGS. 11 and 12 illustrate transmission electron microscope (TEM) images of the hollow metal nano particles fabricated according to Example 3.

The average particle diameter of the hollow metal nano particles obtained by Example 3 was 15 nm.

Referring to FIG. 13, it is possible to define a length from a starting point to an end point in a graph in which the peaks of Pt, which is a second metal according to the definition of the present specification, are connected, as 100% of the particle diameter of the hollow metal nano particles. At this time, the starting point is a point of point number 0, and the end point is a point of point number 85. At this time, it can be confirmed that one Pt major peak is present at a point from point number 10 to point number 13 within a region that is 0% to 30% from one end point of the particle diameters, and another Pt major peak is present at a point from point number 70 to point number 73 within a region that is 0% to 30% from the other end point of the particle diameters.

Furthermore, in FIG. 13, it can be confirmed that a plurality of peaks showing the atomic percentage of Ni, which is the first metal, is present in the entire region of particle diameters.

Comparative Example 1

0.05 mmol of $K_2PtCl_4$ as a first metal salt, 0.05 mmol of $NiCl_2$ as a second metal salt, and 0.56 mmol of cetyltrimethylammonium bromide (CTAB) as a cationic surfactant were added to and dissolved in 80 ml of distilled water to form a solution, and the solution was stirred for 30 minutes. At this time, the molar ratio of $K_2PtCl_4$ to $Ni(NO_3)_2$ was 1:1, and at this time, the concentration of the CTAB measured was approximately seven times the critical micelle concentration (CMC) to water.

Subsequently, 0.3 mmol of $NaBH_4$ which is a reducing agent and 2 ml of distilled water were added to the solution and the mixture was left to react for 30 minutes. After the mixture was centrifuged at 10,000 rpm for 10 minutes, the supernatant in the upper layer was discarded, the remaining precipitate was re-dispersed in 20 ml of distilled water, and then the centrifugation process was repeated once more to fabricate hollow metal nano particles composed of a hollow core and a shell.

FIG. 9 illustrates a transmission electron microscope (TEM) image of the hollow metal nano particles fabricated according to Comparative Example 1, and it can be confirmed that the hollow metal nano particles are spherical particles with a size of approximately 5 nm, which do not have a hollow core form, or show a form in which elliptical shapes or long rod shapes are aggregated.

The Examples of the present application have been described with reference to the accompanying drawings, but the present application is not limited to the Examples and may be fabricated in various forms, and it will be understood by a person with ordinary skill in the art to which the present application pertains that the present application may be implemented in other specific forms without modifying the technical spirit or essential feature of the present application. Therefore, it is to be appreciated that Examples described above are intended to be illustrative in every sense, and not restrictive.

What is claimed is:

1. Hollow metal nano particles comprising:
a hollow core portion; and
a shell portion consisting of a first metal and a second metal,
wherein at least two major peaks showing an atomic percentage of at least one of the first metal and the second metal are present in element analysis data of the particles, and
wherein the hollow metal nano particles have an average particle diameter of 12 nm or less,
wherein the first metal is platinum (Pt), the second metal is nickel (Ni), cobalt (Co) or iron (Fe), and
the hollow metal nano particles comprise an anionic surfactant or a cationic surfactant inside the hollow core,
wherein the hollow metal nano particles are fabricated by a method comprising:
1) adding a first metal salt, a second metal salt, and a surfactant to a solvent to form a solution; and
2) adding a reducing agent to the solution formed in 1) to form the hollow metal nano particles,
wherein the solution of step 1) is formed by forming a micelle by the surfactant and surrounding an outer portion of the micelle with the first metal salt and the second metal salt, and the hollow metal nano particles of step 2) are formed by forming the micelle region to a hollow form, and
wherein the concentration of surfactant in the solution may be one time or more and 5 times or less of the critical micelle concentration (CMC) to water.

2. The hollow metal nano particles of claim 1, wherein when a particle diameter of the hollow metal nano particles is set to 100%, at least one major peak showing an atomic percentage of the first metal is present within a region that is 0% to 30% from one end point of particle diameters, and at least another major peak showing an atomic percentage of the first metal is present within a region that is 0% to 30% from the other end point of the particle diameters.

3. The hollow metal nano particles of claim 1, wherein when a particle diameter of the hollow metal nano particles is set to 100%, at least one major peak showing an atomic percentage of the second metal is present within a region that is 0% to 30% from one end point of the particle diameters, and at least another major peak showing an atomic percentage of the second metal is present within a region that is 0% to 30% from the other end point of the particle diameters.

4. The hollow metal nano particles of claim 1, wherein a plurality of peaks showing an atomic percentage of the first metal or the second metal is present in an entire region of the particle diameters.

5. The hollow metal nano particles of claim 1, wherein at least two major peaks showing an atomic percentage of the first metal are present, and at least two major peaks showing an atomic percentage of the second metal are present.

6. The hollow metal nano particles of claim 1, wherein at least two major peaks showing an atomic percentage of the first metal are present, and a plurality of peaks showing an atomic percentage of the second metal is present in an entire region of the particle diameters.

7. The hollow metal nano particles of claim 1, wherein at least two major peaks showing an atomic percentage of the second metal are present, and a plurality of peaks showing an atomic percentage of the first metal is present in an entire region of the particle diameters.

8. The hollow metal nano particles of claim 1, wherein cross-sectional element analysis data of the particles are obtained using an energy dispersive spectrometer (EDS).

9. The hollow metal nano particles of claim 1, wherein the hollow metal nano particles have an average particle diameter of 10 nm or less.

10. The hollow metal nano particles of claim 1, wherein the hollow metal nano particles have an average particle diameter of 6 nm or less.

11. The hollow metal nano particles of claim 1, wherein the shell portion has a thickness of 5 nm or less.

12. The hollow metal nano particles of claim 1, wherein the shell portion has a thickness of 3 nm or less.

13. The hollow metal nano particles of claim 1, wherein a volume of the hollow core is 50% by volume or more of a total volume of the hollow metal nano particles.

14. The hollow metal nano particles of claim 1, wherein a particle diameter of a hollow metal nano particle is within a range from 80% to 120% of an average particle diameter of the hollow metal nano particles.

15. The hollow metal nano particles of claim 1, wherein the shell portion comprises a shell including both the first metal and the second metal.

16. The hollow metal nano particles of claim 1, wherein an atomic percentage ratio of the first metal to the second metal in the shell portion is 1:5 to 10:1.

17. The hollow metal nano particles of claim 1, wherein the shell portion comprises a first shell including the first metal; and a second shell including the second metal.

18. The hollow metal nano particles of claim 1, wherein the shell portion is formed throughout an outer side surface of the hollow core portion.

19. The hollow metal nano particles of claim 1, wherein the hollow metal nano particles have a spherical shape.

* * * * *